April 28, 1953     T. O. RUEB     2,636,759
FRICTION JOINT
Filed July 6, 1949
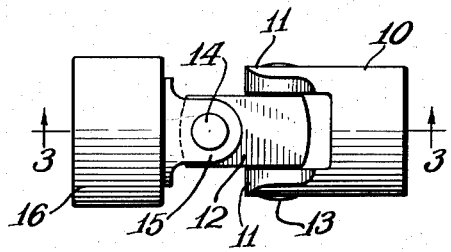
Fig. 1.
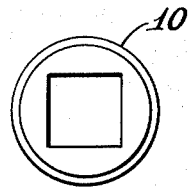
Fig. 2.
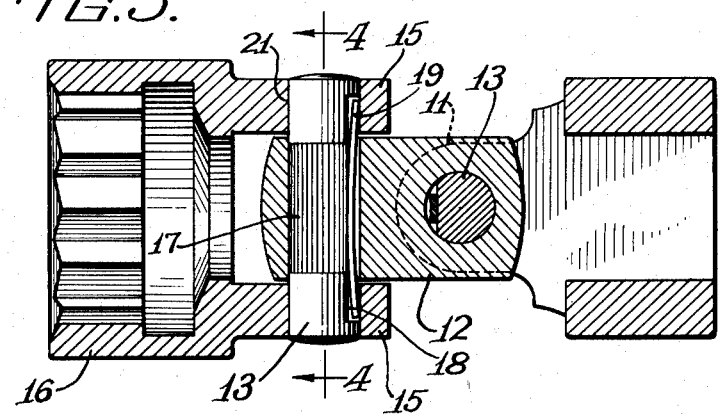
Fig. 3.
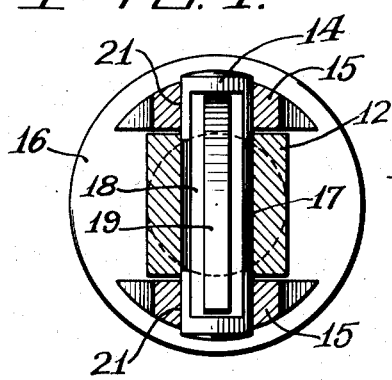
Fig. 4.
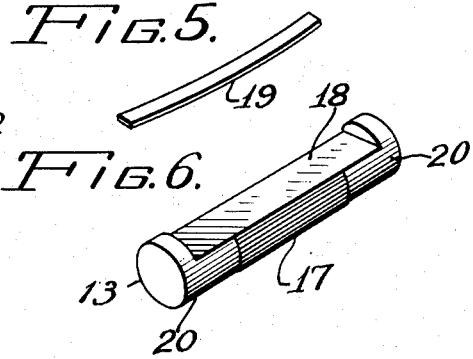
Fig. 5.
Fig. 6.
Inventor:
Theodore O. Rueb
By Glenn S. Noble
Attorney Patented Apr. 28, 1953

2,636,759

UNITED STATES PATENT OFFICE 2,636,759

FRICTION JOINT

Theodore O. Rueb, Chicago, Ill., assignor to The Sherman-Klove Co., Chicago, Ill., a corporation of Illinois Application July 6, 1949, Serial No. 103,199

2 Claims. (Cl. 287—94)

This invention relates to friction joints which are particularly applicable to universal joints used in connection with wrenches or other similar tools such as more particularly set forth in my Patent No. 2,334,039, patented November 9, 1943.

In universal joints of this character such as previously used, the movable parts are usually connected by means of rivets which are headed or secured in the fork members in order to hold the parts together. In order to rivet or form heads of such holding members, it is necessary to make them of sufficiently soft steel to permit such operation. However, in using such joints, the strains are apt to be transmitted principally from the block to the fork due to the yielding of the relatively soft rivets. As a consequence, the fork members are spread apart and the joint is broken or ruined. Furthermore, in such previous devices, friction in some instances was provided between the pins or rivets and the blocks, but such arrangement has not proven satisfactory.

The principal objects of the present invention are to provide an improved friction joint of the character indicated; to provide a friction joint in which there are no rivets but in which the pins are formed of hardened metal and secured in position without riveting; to provide a friction joint in which a friction is provided between the pins and the coacting yokes; to provide a friction joint in which the strains are taken up by shear action on the pins; and in general, to provide such an improved device as will be described more fully hereinafter.

In the accompanying drawings illustrating this invention,

Fig. 1 is a side view of a universal joint embodying the invention;

Fig. 2 is an end view;

Fig. 3 is an enlarged longitudinal sectional view taken substantially on the line 3—3 of Fig. 1;

Fig. 4 is a sectional view taken substantially on the line 4—4 of Fig. 3;

Fig. 5 is a perspective detail of the tension spring; and

Fig. 6 is a perspective detail of one of the pins or pivots.

As shown in these drawings, the universal or flexible joint head or socket 10 is adapted to receive a wrench bar (not shown) and is bifurcated to provide lugs 11, comprising the fork for receiving one end of a block 12 which is secured thereto by means of pin or pivot members 13. The other end of the block is secured by a similar pin 14 with the fork 15 of a coacting head or socket 16 which is adapted to engage with a nut or to hold any suitable tool.

The construction and arrangement of the pins 13 and 14 and method of assembling the same with their tension springs constitute one of the important features of this invention. These pins are made of suitable stock which is adapted to be hardened and are ground finished to accurate size. The longitudinal central portions of the pins are knurled as shown at 17 where they engage with the block 12. Such knurling operation usually leaves the outer circumference somewhat irregular and the pins are preferably forced through suitable dies to bring them to accurate size. One side of each pin is then broached or cut away as shown at 18 for receiving the spring 19. The broach or channel terminates at a short distance from each end of the pin leaving trunnions 20 for engagement with the holes 21 in the lugs or fork members 11 as best shown in Fig. 3. It will also be noted that the channel is sufficiently long so that the ends of the spring 19 when in assembled position will engage with the walls of the holes 21, thus placing tension or friction between the trunnions and the forks.

After the pins or pivots have been hardened or tempered to the desired hardness, they are inserted with the springs by means of suitable dies. The knurled portions are preferably slightly larger than the ends or trunnions of the pins so that when they are pressed or forced into the holes in the block or connecting member 12, they will be held securely therein while the trunnions are free to rotate in the lugs. The width of the block is preferably slightly less than the distance between the faces of the lugs so that any twisting strain on the block will not be transmitted by pressure against the lugs. The entire twisting or turning load is taken up as in shear against the pins. On account of the pins being made of hardened steel, or the like, they will resist even excessive strains and there will be little or no tendency to deform the parts of the joint.

While the trunnions are freely rotatable in the holes in the forks, the springs 19 will tend to urge the opposite sides of the trunnions against the walls of the holes to provide sufficient friction to hold the joint members in predetermined position as for engaging the wrench with a nut in an inaccessible position.

I have shown and described a commercial form of my invention, and what I claim is:

1. A joint of the character set forth, comprising a forked element, a block embraced by said fork element having a bore therethrough, a pin formed of hard metal with its central portion knurled and fixed in said block with its ends pivotally engaging with the fingers of the fork element, and spring means between the pin and the fingers of the fork element to urge the pin into increased frictional engagement with the fork element which will tend to prevent rotation of the element on the pin.

2. In a friction joint or the like, the combination of a link, a hardened steel pin having its central portion knurled and fitting tightly in a hole in said link with its smooth ends extending beyond the sides of the link, a fork member having bearings engaging with the ends of the pin, said pin having a longitudinal recess in the side thereof which terminates within the bearings, and a flat spring mounted in said recess with its ends engaging with the bearings in the forks and biased to press the ends of the pin against the sides of the bearing, said link being of less width than the space between the forks whereby twisting movement between the link and the fork will be resisted by shearing action against the pin.

THEODORE O. RUEB.

References Cited in the file of this patent
UNITED STATES PATENTS

| Number | Name | Date |
|---|---|---|
| 2,334,039 | Rueb | Nov. 9, 1943 |